July 22, 1958

A. D. BEARD 2,844,434

MAGNETIC RECORDING

Filed July 31, 1952

INVENTOR.
Arthur D. Beard

BY Morris D. Rabkin

ATTORNEY 2,844,434
Patented July 22, 1958

2,844,434

MAGNETIC RECORDING

Arthur D. Beard, Haddonfield, N. J., assignor to Radio Corporation of America, a corporation of Delaware Application July 31, 1952, Serial No. 302,013
10 Claims. (Cl. 346—74)

This invention relates to magnetic recording, and more particularly to means for recording coded bits of information on a magnetizable medium.

In the art relating to automatic accounting equipment, data to be utilized by the equipment may take the form of a number of pulses impressed upon a magnetizable record member.

It is an object of the present invention to provide a novel means for impressing such pulse signals onto a magnetizable record member.

It is another object of this invention to provide a novel recording unit for use with a magnetizable record member.

It is a further object of this invention to provide an improved magnetic recording system which is adapted to record pulse data in the form of a multiple digit, binary-type code.

In accomplishing these and other objects, there has been provided, in accordance with the present invention, a means resembling a typewriter wherein a plurality of recording heads are arranged, in alignment, in a position adjacent to a path along which a record tape may be intermittently moved. The several heads correspond to the several digits of a multiple digit code. Selected ones of the heads are energized or actuated to impress a magnetic representation of a signal onto a tape record. Each of the heads is provided with a high-reluctance back gap and closure means for that gap which is selectively operable to permit the establishment of a magnetic flux across a signal translating gap thereof.

Figures 1, 2, 3:
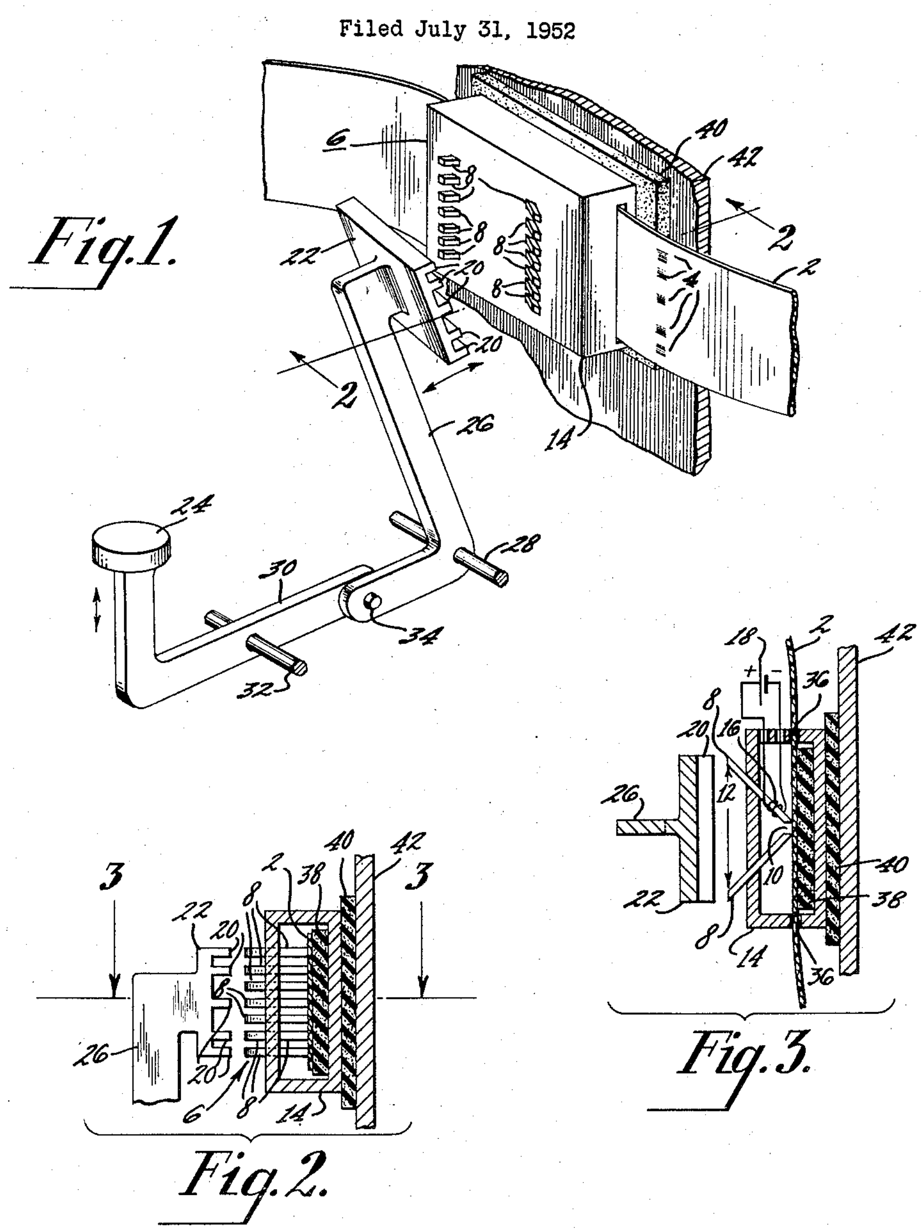
Figure 4:
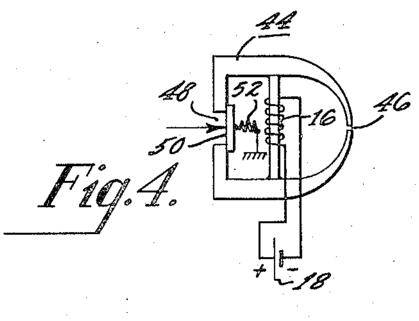

A better understanding of this invention may be had from the following detailed description when read in connection with the accompanying drawing, in which:

Figure 1 is a perspective view of a schematic representation of a device embodying the present invention, Figure 2 is a sectional view taken along the line 2—2 of Figure 1, Figure 3 is a sectional view taken along the line 3—3 of Figure 2, Figure 4 is an end view of a different form of recording head embodying the present invention.

Referring now to the drawings in more particularity, there is shown, in Figures 1, 2 and 3, a magnetic tape record member 2 upon which signals 4 are impressed by a recording unit 6. The recording unit, shown in more detail in Figures 2 and 3, comprises a plurality of recording heads 8, each head having a signal translating gap 10 and a high-reluctance back gap 12. The heads are permanently mounted in a support member such as block 14, adjacent to a path of movement of the tape 2. The heads may be continuously excited by a suitable exciting means such as coils 16 and battery 18. They may, of course, be excited by a source of A. C. signal instead of D. C. obtained from the battery 18. Due to the high-reluctance of the back gap 12 substantially no signal will be impressed across the signal translating gap 10. However a shorting bar 20 across the back gap 12 will permit a magnetic flux to flow in both legs of the head and thereby produce a signal across the signal translating gap 10 which is impressed upon the tape 2 placed contiguous thereto.

When it is desired to produce a group of pulses simultaneously, such pulses being, for example, a binary coded designation for a unit of information, a separate head is used for each pulse being represented. In the instant application seven such heads are illustrated. To facilitate the recording of such coded material on the tape a number of shorting bars corresponding to a particular code character are incorporated into a unitary member 22 which corresponds substantially to the type member of a typewriter. In Fig. 1, this relationship is schematically represented by the linkage connecting the unitary member to a manual key 24, the linkage comprising a lever 26, a pivot 28 about which the lever 26 may rotate, a second lever 30 connected to the manual key and a pivot 32 about which the lever 30 rotates and a connecting pin 34 which transfers the motion of the manual key 24 and its lever 30 to the lever 26 and hence to the unitary member 22. It will, of course, be appreciated that an apparatus adapted to record information onto a tape record member, as set forth herein, would include a number of coded unitary members as well as the associated linkage connecting said members to corresponding manual keys.

In the support member or mounting block 14 there are provided passageways 36 through which the tape member 2 may pass into and out of the block. Backing up the tape 2 on the side opposite from the recording heads 8 is a resilient cushion 38. A second cushion 40 may be placed between the mounting block 14 and the main frame or chassis 42 of the machine.

In Figure 4, the recording head is similar in principle to that shown in Figures 2 and 3 with the exception that a shorted magnetic path 44 is provided shunting the signal translating gap 46. A high-reluctance back gap 48 is provided which is closed by shorting bar or member 50. This member may be biased by a spring 52 or the like to keep the back gap closed. When the spring bias is overcome and the back gap is open by moving the shorting member in the direction indicated by the arrow, a high-reluctance is introduced into the shunt magnetic path thereby causing the magnetic flux to flow through the magnetic structure across the signal translating gap 46. The several shorting bars 50 may be actuated by a member similar to the unitary member 22 mounted on similar linkages.

Thus, for a complete code "writing" machine there is provided a suitable tape reeling mechanism (not shown) including an intermittent feed for the tape. There is a manual key for each of the code characters and each key is connected through a suitable linkage to a member such as the one designated herein as a unitary member 22. The linkages and the unitary members are arranged in a manner comparable to that found in a conventional typewriter. Upon depression of any one of the manual keys, the associated unitary member moves to a position where it actuates the selected heads of the recording unit, impressing the selected code designation on the tape.

Thus it may be seen that there has been provided a novel recording system adapted to impress pulse coded signals onto a magnetic record tape.

What is claimed is:

1. In a magnetic recording system the combination comprising a plurality of recording heads, each of said heads comprising a core structure of magnetic material having a gap for establishing a signal recording flux and another gap spaced therefrom providing a higher reluctance than said signal gap, and means for reducing the reluctance of said other gap of each of said heads, said means including members of magnetic material selectably movable with respect to different ones of said heads.

2. In a magnetic recording system, in combination, a recording unit comprising a plurality of recording heads, each of said heads having a signal gap and back gap having a high reluctance with respect to said signal gap, said heads being mounted with said signal gaps in alignment with each other and said high reluctance gaps in alignment with each other, closure means for each of said high reluctance gaps, and means operable to move said closure means with respect to said high reluctance gaps to provide for the establishment of a magnetic flux across selected ones of said signal gaps whereby selected ones of said heads are actuated.

3. In a magnetic recording system, in combination, a recording unit comprising a plurality of recording heads, each of said heads having a signal gap and a back gap having a high reluctance with respect to said signal gap, means for mounting said heads with said signal gaps in alignment with each other and with said high reluctance gaps in alignment with each other, means for magnetically energizing said heads, and means for closing selected ones of said high reluctance gaps to provide for the establishment of a magnetic field across corresponding ones of said signal gaps whereby corresponding ones of said heads may be actuated.

4. In a magnetic recording system, in combination, a recording unit comprising a plurality of recording heads, each of said heads having a signal gap and a back gap having a high reluctance with respect to such signal gap, said heads being mounted with said signal gaps in alignment, and closure means for each of said high reluctance gaps, means for moving said closure means selectably with respect to each of said magnetic heads for establishing a magnetic flux across selected ones of said signal gaps.

5. In a magnetic recording system, in combination, a recording unit comprising a plurality of recording heads, each of said heads having a signal gap and a back gap having a high reluctance with respect to said signal gap, means for magnetically energizing said heads, means for closing selected ones of said high reluctance gaps, said closing means including a magnetic shorting bar, and means for moving said shorting bar into shorting relation with selected ones of the high reluctance gaps of said heads whereby to provide a magnetic flux path in the selected ones of said heads thereby actuating said heads.

6. In a magnetic recording system, in combination, a recording unit comprising a plurality of recording heads, each of said heads having a signal gap and back gap having a high reluctance with respect to said signal gap, means for magnetically energizing said heads, closure means for each of said high reluctance gaps, said closure means providing a shunt path for the magnetic flux of said energizing means away from said signal gap, and means for opening selected ones of said closure means whereby said shunt path is broken in corresponding ones of said heads thereby to provide for the establishment of a magnetic flux across the signal gaps of said corresponding ones of said heads.

7. In a system for recording multiple digit code pulses onto a magnetic record member, in combination, a recording unit comprising a plurality of recording heads corresponding in number to the maximum number of digits in the code, each of said heads having a signal gap and a back gap having a high reluctance with respect to said signal gap, a plurality of unitary members each of which includes a number of closure means for said high reluctance gaps, said closure means on individual ones of said unitary members corresponding in number and position to the characters of said code, and operating means associated with each of said unitary members to selectively move separate ones of said unitary members into a position adjacent said recording unit whereat said closure members effectively close said high reluctance gap to provide a flux path in selected ones of said recording heads whereby to actuate said selected ones of said heads.

8. A magnetic recording head assembly comprising a core structure of magnetic material having a pair of gaps therein, one of said gaps being wider than the other to provide a magnetic reluctance sufficient to block the establishment of a signal recording flux in the other of said gaps, and a body of magnetic material movable with respect to said core structure into and out of magnetic contact with the portions of said structure defining said wider gap to reduce the reluctance thereof.

9. A magnetic recording head assembly comprising a core structure of magnetic material defining a magnetic circuit having a pair of gaps, one of said gaps being spaced from the other and providing a magnetic reluctance in said circuit sufficient to block the establishment of signal recording flux in said other gap, and means for selectably decreasing said reluctance, said means including a member of magnetic material movable with respect to said core structure into and out of the portion of the magnetic circuit defined by said other gap.

10. A magnetic recording head assembly comprising a core structure defining a magnetic circuit including a first gap and a second gap, said second gap providing a magnetic reluctance in said circuit sufficient to block the establishment of a magnetic recording flux in said first gap, a signal translating coil magnetically coupled to said core structure for establishing a signal flux therein, a member of magnetic material pivotally movable with respect to said core structure, and means for moving said member to magnetically shunt said high reluctance gap.

References Cited in the file of this patent

UNITED STATES PATENTS

| | | |
|---|---|---|
| 901,397 | Stuart | Oct. 20, 1908 |
| 2,402,985 | Caughey | July 2, 1946 |
| 2,560,474 | Potts | July 10, 1951 |
| 2,662,120 | Anderson | Dec. 8, 1953 |

FOREIGN PATENTS

| | | |
|---|---|---|
| 237,269 | Switzerland | Aug. 16, 1945 |